(12) United States Patent
Mealy

(10) Patent No.: US 8,633,894 B1
(45) Date of Patent: Jan. 21, 2014

(54) FOLDED FOCAL LENGTH OPTICS FOR AN OPTICAL MOVEMENT SENSOR

(75) Inventor: James Mealy, Corvallis, OR (US)

(73) Assignee: Marvell International Ltd. (BM)

( * ) Notice: Subject to any disclaimer, the term of this patent is extended or adjusted under 35 U.S.C. 154(b) by 1143 days.

(21) Appl. No.: 12/573,399

(22) Filed: Oct. 5, 2009

Related U.S. Application Data

(60) Provisional application No. 61/105,574, filed on Oct. 15, 2008.

(51) Int. Cl.
*G09G 5/08* (2006.01)

(52) U.S. Cl.
USPC ........................................................ 345/166

(58) Field of Classification Search
USPC ........................................................ 345/166
See application file for complete search history.

(56) References Cited

U.S. PATENT DOCUMENTS

| | | | |
|---|---|---|---|
| 4,521,772 A * | 6/1985 | Lyon | 345/166 |
| 4,804,949 A | 2/1989 | Faulkerson | |
| 5,175,422 A * | 12/1992 | Koizumi et al. | 235/472.01 |
| 5,463,387 A | 10/1995 | Kato | |
| 5,994,710 A | 11/1999 | Knee et al. | |
| 6,585,158 B2 | 7/2003 | Norskog | |
| 2003/0112220 A1* | 6/2003 | Yang et al. | 345/156 |
| 2004/0212677 A1* | 10/2004 | Uebbing | 348/155 |
| 2005/0057510 A1 | 3/2005 | Baines et al. | |
| 2005/0111104 A1* | 5/2005 | Tseng | 359/618 |
| 2007/0013661 A1* | 1/2007 | Theytaz et al. | 345/166 |
| 2009/0060283 A1 | 3/2009 | Bledsoe et al. | |

* cited by examiner

*Primary Examiner* — William Boddie
*Assistant Examiner* — Andrew Schnirel

(57) ABSTRACT

Devices, systems, methods, and other embodiments associated with an optical movement sensor are described. In one embodiment, an optical system reflects light from a surface and folds the light. The folded light is focused onto an image sensor within a handheld device. The image sensor generates image data of the focused light to determine motion of the handheld device relative to the surface.

18 Claims, 4 Drawing Sheets

FOLDED FOCAL LENGTH OPTICS FOR AN OPTICAL MOVEMENT SENSOR

CROSS REFERENCE TO RELATED APPLICATIONS

This application claims the benefit of U.S. provisional application Ser. No. 61/105,574, filed on Oct. 15, 2008, which is hereby incorporated by reference.

BACKGROUND

A tracking device like a computer mouse can use an optical movement sensor to determine motion of the mouse. One type of optical movement sensor operates by focusing and sensing images of a surface on which the mouse moves. The surface is illuminated by, for example, light emitting diodes (LEDs) or a laser to emphasize imperfections on the surface.

The mouse determines movement by periodically sampling images from the surface and comparing new images to previous images. A process of image correlation is then used to extract and compute a composite offset of the new image as compared to the previous image. The image correlation process can produce inaccurate results when the image is out of focus. Blurring of the image reduces edge contrast and the reliability of the computed composite offset. Loss of focus limits the range of acceptable surfaces on which the image correlation process will function.

Small imperfections on a lens in the optical path can accentuate geometric variations of the optical path. Geometric variations can cause loss of focus and degrade the performance of an image correlation process, introduce scaling errors in computed movement measurements, and introduce angular anisotropy in the computed measurements. A better way of sensing movement may be desirable.

SUMMARY

In one embodiment, an optical system for a handheld device comprises a housing formed with an opening and a light source for providing illumination of a surface. A mirror is mounted in the housing, where light received through the opening in a direction substantially perpendicular to the surface is reflected by the mirror in a direction substantially parallel to the surface. An image sensor positioned within the housing senses light reflected from the mirror. The image sensor generates images from the sensed light for determining movement of the optical system relative to the surface. A lens mounted between the mirror and the image sensor focuses the light reflected from the mirror onto the image sensor.

In another embodiment, an optical system comprises an image sensor configured to generate image data associated with a surface as the optical system is moved over the surface. A light folding device is configured to optically fold light received from the surface with multiple overlapping reflections. A lens within the image folding device is configured to optically focus the light onto the image sensor.

In another embodiment, a method includes reflecting light from a surface and folding the light. The folded light is focused onto an image sensor within a handheld device. The image sensor generates image data of the focused light to determine motion of the handheld device relative to the surface.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
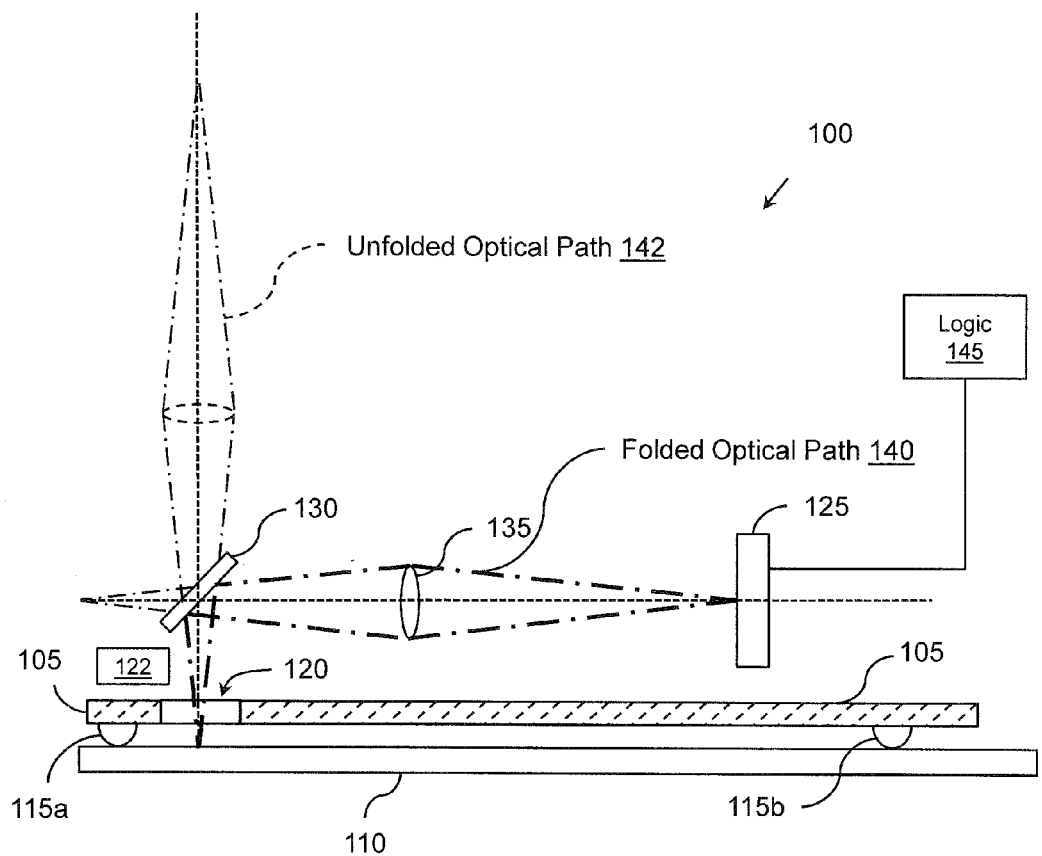
FIG. 1 illustrates an embodiment of an optical system for motion detection.

Described herein are devices, methods and other embodiments associated with optical movement systems, for example, for a computer mouse, tracking device, or other handheld device. In one embodiment, the optical movement system detects movement of the handheld device relative to a surface. The optical movement system is designed with a lengthened or folded optical path while operating within a limited space of the handheld device.

Prior to considering the present system, consider the following example of how an optical image sensor is used to capture back-to-back images as a handheld device like a mouse is moved over a surface. The mouse has a body that is shorter in a vertical direction (height: perpendicular to the surface) than in a horizontal direction (length: parallel to the surface). Such a body allows the mouse to conform to the shape of a hand. A short optical path in the vertical direction can directly receive an image from a surface. The short optical path directly focuses the image onto a sensor mounted on a circuit board in the mouse. It is difficult to significantly increase the length of the short optical path in the mouse since the mouse has a short height. Increasing the height would increase a profile of the mouse and the mouse would no longer conform to the shape of a hand.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, flash memory, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, instructions stored or in execution on a machine, and/or combinations of each to perform a function (s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include at least one circuit one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an optical system 100 that is implemented in a handheld device (e.g. a computer mouse or a handheld printing device). FIG. 1 is shown as a side and partial cross-section view. The handheld device includes a housing wall 105, which forms part of a housing that contains the optical system 100. Only one portion of the housing wall 105 is illustrated in FIG. 1, which is a wall adjacent to an exterior surface 110. For example, the housing wall 105 is the bottom of a mouse and the surface 110 is a desktop, mouse pad, or other exterior surface. It will be appreciated that the housing wall 105 forms a full or at least a partial enclosure for the device based on the type of design implemented. Side walls and/or a top wall are not shown but can be used for form the housing. In another embodiment, the housing wall 105 can include spacers 115a, 115b to space the bottom of housing 105 from the surface 110.

The housing wall 105 is formed with an opening 120. A light source 122 is mounted in a position to illuminate the exterior surface 110 near and/or under the opening 120. The light source 122 can be mounted within the optical system 100 to transmit light out through the opening 120 or mounted on the housing wall 105 outside of the opening 120. When the exterior surface 110 is illuminated (e.g. a portion under the opening 120), light from the illuminated portion reflects into the optical system 100 through the opening 120. In the figures, the light is represented as dashed lines. An image sensor 125 is positioned within the housing to sense the light and collect images. The light is detected and sampled by the image sensor 125 continuously or periodically to generate a series of sampled images of the surface 110 (e.g. a series of frames). In one embodiment, the image sensor 125 includes an array of photodiodes, photodetectors, or other type of light sensing device that generates image data from the sensed light.

To direct the light, the optical system 100 includes a mirror 130. The mirror 130 is positioned to reflect the light from the surface 110 toward the image sensor 125. For example, the mirror 130 receives light from the surface 110 through the opening 120. The light enters the opening in a direction substantially perpendicular to the surface 110. The direction can also be regarded as generally perpendicular to the housing wall 105. As shown in FIG. 1, the perpendicular direction is a vertical direction although the direction would change depending on the orientation of the device.

The mirror 130 reflects the light in a direction substantially parallel to the surface 110 (or housing wall 105) toward the image sensor 125. A lens 135 mounted between the mirror 130 and the image sensor 125 focuses the light onto the image sensor 125. The image sensor 125 senses the light and generates image data of the surface 110. The image data can then be processed by logic 145 to determine movement. For example, movement can be determined using a movement detection algorithm that compares a series of captured images from the image data to determine how far and in what direction the optical system 100 has moved with respect to the surface 110. The logic 145 can be implemented in the handheld device or the optical system 100 can send the image data to a remote device for processing (e.g. to a computer via cable or wirelessly). The determined movement can then be used to control the movement of a pointing device on a display (e.g. a mouse cursor on a computer display).

An optical path is defined between the mirror 130 and the image sensor 125. The optical path is referred to herein as a parallel optical path since the path is generally parallel to the surface 110 or housing wall 105. Another optical path is defined between the mirror 130 and the surface 110. This optical path is referred to herein as a perpendicular optical path. The configuration of the optical system 100 is designed so that the parallel optical path is longer than the perpendicular optical path.

The reflection of light by the mirror 130 creates a folded optical path 140 (e.g. formed from the combined perpendicular and parallel optical paths). In general, the folded optical path is a non-linear path. The folded optical path 140 functions to lengthen or otherwise increase the total length of the optical path. Handheld devices such as a computer mouse or handheld printing device are generally longer in a horizontal direction (e.g. length) than in a vertical direction (e.g. height). Therefore, these types of devices have limited internal space. Reflecting the light in multiple directions within the device creates a longer optical path. In comparison, FIG. 1 also shows an unfolded optical path 142 that would exist without mirror 130. The unfolded optical path 142 is not implementable in a mouse because a typical mouse is not tall enough to accommodate the unfolded optical path 142. Rather, the typical mouse mounts the image sensor 125 where the mirror 130 is mounted and receives light directly from the surface 110.

Using a longer optical path can help to reduce scaling errors due to media spacing variations or geometrical/manufacturing variations, for example. Variations in media spacing (e.g. the spacing between the bottom of the mouse wall 105 and the exterior surface 110) will occur when the mouse is moved across the surface 110. By creating a folded optical path that is lengthened, the effects of scaling errors can be reduced.

In contrast, a short optical path is more susceptible to such variations. An example of a short path would be where the image sensor 125 is mounted at the position of the mirror 130 so that there is direct linear path from the surface 110 to the image sensor 125. A focusing lens in the short path would have a greater curvature than the lens 135 in the longer, folded optical path 140. A short optical path accentuates geometric variations in the optical geometry. Implementing a longer optical path helps to reduce geometrical variations, which in turn can improve the focusing of an image on the image sensor 125. Improved focus enhances the performance of logic 145 that determines movement from sampled image data. Improved focus can also reduce scaling errors in movement measurements calculated by the logic 145.

In one embodiment, the optical system 100 may be implemented with a movement detection chip (not shown). The movement detection chip processes the image data (e.g. series of frames) from the image sensor 125 to track the position of the optical system 100 with respect to the surface 110. In other embodiments, the image sensor 125, mirror 130, and lens 135 are mounted on a circuit board attached to the housing wall 105.

In another embodiment, a portable print device is implemented with the optical system 100 to track its location with respect to a medium (e.g. paper) that is to be printed with an image. As the portable print device is moved over the medium, a print head (not shown) in the portable print device prints the image onto the medium. The print head can be an ink jet print head or other type of imaging mechanism.

Figure 2:
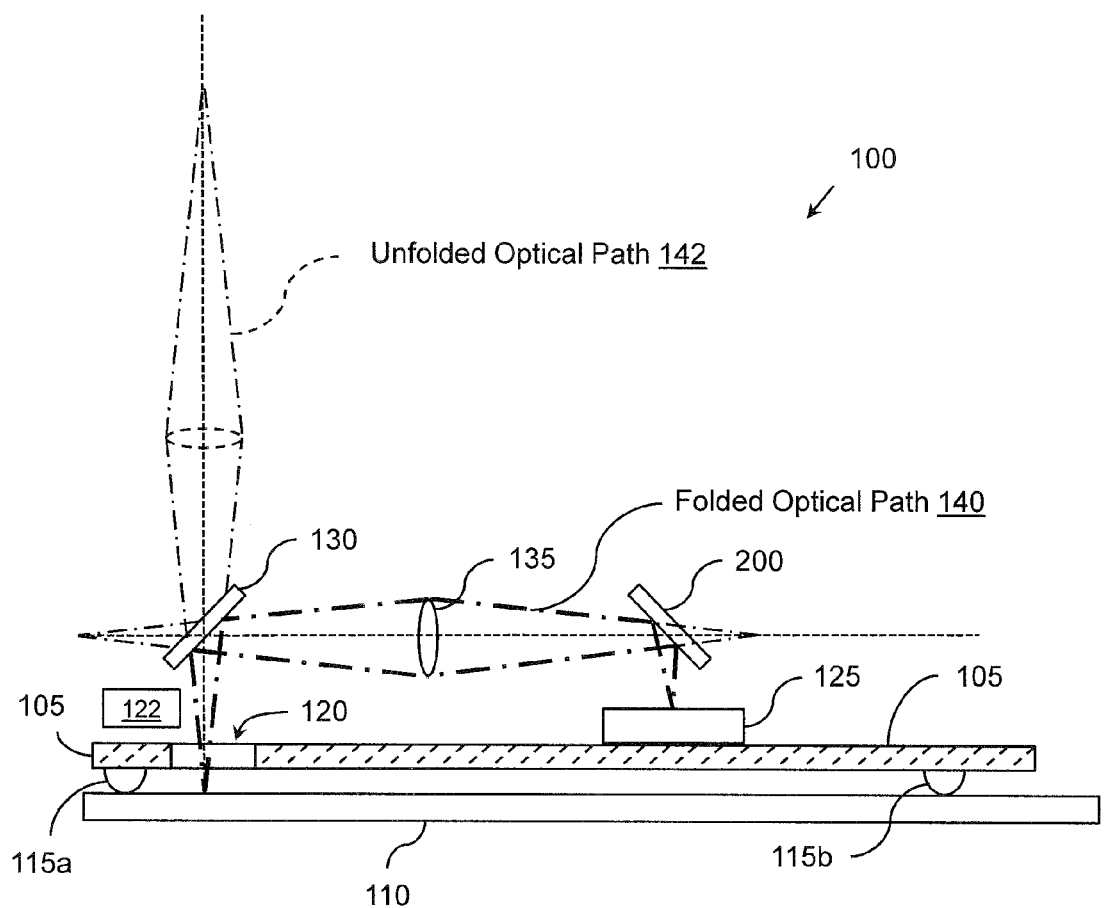
FIG. 2 illustrates another embodiment of an optical system.

With reference to FIG. 2, another embodiment of the optical system 100 is shown. Components in FIG. 2 that are similar to components of FIG. 1 are labeled with the same reference numbers. The folded optical path 140 can be created with other configurations using different lenses and/or additional mirrors. For example the optical system 100 includes at least a second mirror 200 (e.g. a deflection mirror). In this embodiment, the image sensor 125 is mounted to the housing wall 130 (e.g. on a circuit board, not shown). The second mirror 200 is mounted to reflect light from the lens 135 toward the image sensor 125 (e.g. in a downward direction in FIG. 2). In this configuration, the folded optical path 140 is folded twice—once by the mirror 130 and once by the mirror 200. In other embodiments, additional mirrors can be used to fold the optical path 140 multiple times, which will increase the optical path length.

Figure 3:
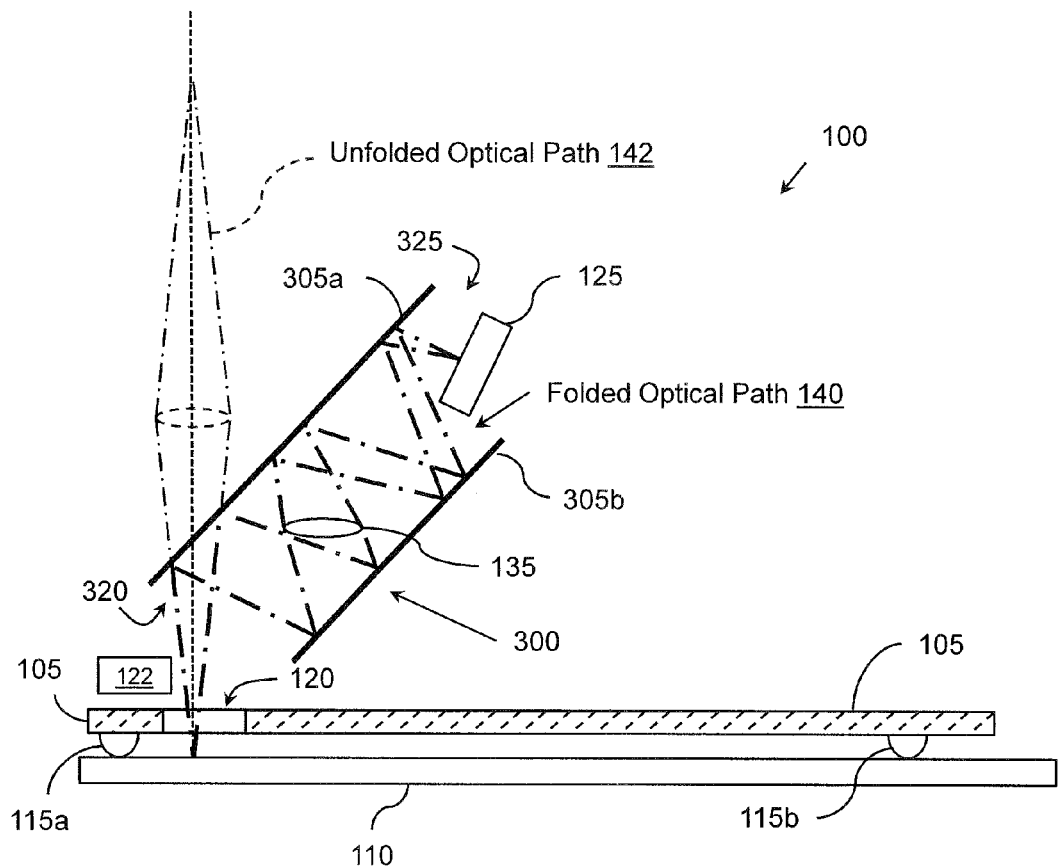
FIG. 3 illustrates another embodiment of an optical system.

FIG. 3 illustrates another embodiment of the optical system 100 where the folded optical path 140 is created by folding light with multiple overlapping reflections. To fold the light, the optical system 100 includes a light folding device 300 that reflects the light between mirrored surfaces 305 and focuses the light onto the image sensor 125. Light reflected from the exterior surface 110 is reflected multiple times before the light reaches the image sensor 125. Thus the length of the folded optical path 140 is increased.

In one embodiment, the light folding device 300 includes two parallel and opposing mirrors 305*a* and 305*b*. In another embodiment, the light folding device 300 is a tube-like structure formed with a reflective interior. The tube-like structure can be rectangular, circular, or other shape. The lens 135 is mounted within the light folding device 300 in a position to cause the reflecting light to focus onto the surface of the image sensor 125. As previously discussed, images captured by the image sensor 125 are used to determine movement of the handheld device relative to the surface 110.

The folded optical path 140 is made longer by having the light reflect multiple times between the mirrors 305*a* and 305*b* and/or by making the length of the mirrors 305*a* and 305*b* longer. In one embodiment, the image folding device 300 has an input end 320 and an output end 325. Light from the surface 110 is received at the input end 320 and the light is focused onto the image sensor 125 at the output end 325.

The image sensor 125 generates image data associated with the surface 110 as the handheld device is moved over the surface 110. The image data can include back-to-back frames of data. A frame is, for example, an image snapshot of a portion of the surface 110. The frames of data can be represented as two-dimensional arrays of pixel data. The image sensor 125 can capture frames at different rates (e.g. at a periodic interval or continuously). The rate of capturing frames can be programmable or set as a default value.

Example methods may be better appreciated with reference to flow diagrams. While for the purposes of simplicity in this explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated, blocks.

Figure 4:
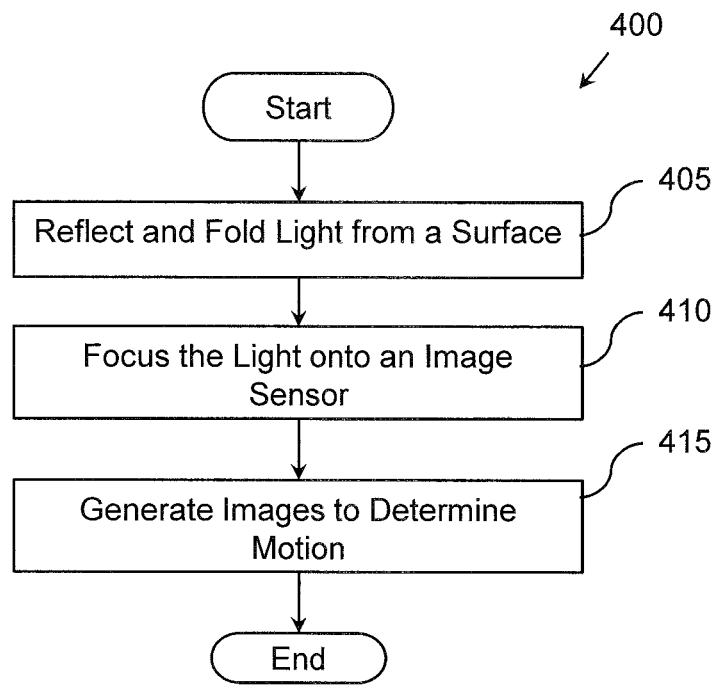
FIG. 4 illustrates an embodiment of a method associated detecting motion.

FIG. 4 illustrates an embodiment of a method 400 associated with detecting motion of a handheld device. As discussed earlier, one way of tracking the handheld device is by capturing images of an exterior surface as the handheld device is moved across the surface. A correlation process compares the captured images to determine a distance and a direction that the handheld device has moved. The movement can then be used to control a cursor or other pointing device on a display screen.

The method 400 begins, at 405, by reflecting and folding light from the exterior surface. As discussed previously, the light is folded one or more times to lengthen an optical path of the light.

At 410, the light is focused onto an image sensor to generate a focused image. The focusing, at 410, is performed in the optical path with a lens that has a focal length to accommodate the lengthened optical path (e.g. a larger focal length). The focal length is larger than a focal length between the reflector and the surface. A long optical path can focus images better than a short optical path because, as discussed above, it has a longer focal length. A lens used to focus a long focal length has less curvature than a lens focusing a short focal length. Furthermore, a longer focal length can help to reduce sensitivity to geometric variations that affect the image size, orientation and/or focus produced by the image sensor 125.

With continued reference to FIG. 4, at 415 images are generated from the optically focused image. In one embodiment, the images are generated as two-dimensional arrays of pixels. The rate at which the arrays of pixels are generated may be a programmable value. An image correlation algorithm can then determine motion of the device by extracting an amount of movement between two back-to-back images. A pointing device can be controlled on a display screen using the determined motion.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods may be implemented in a semiconductor chip. The methods can also be implemented with circuits.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative systems, and illustrative examples shown and described. Thus, this application is intended to embrace alterations, modifications, and variations that fall within the scope of the appended claims.

What is claimed is:

1. An optical system for a handheld device, comprising:
   a housing formed with an opening;

a light source for providing illumination of a surface;

a set of mirrors, being substantially parallel, mounted in the housing, where light received through the opening in a direction substantially perpendicular to the surface is reflected from a first mirror to a second mirror of the set of mirrors and back to the first mirror, wherein the light is reflected multiple times between the set of mirrors;

an image sensor positioned within the housing to sense light reflected from the first mirror or the second mirror, where the image sensor generates images from the sensed light for determining movement of the optical system relative to the surface; and a lens mounted between the set of mirrors for focusing the light reflected between the set of mirrors onto the image sensor.

2. The optical system of claim 1, where the optical system is configured to send the images to a device that determines an amount of movement between the optical system and the surface based, at least in part, on a movement between two different frames in a series of frames.

3. The optical system of claim 1, where the handheld device is a computer mouse or a handheld printing device.

4. The optical system of claim 1, where the image sensor, the set of mirrors, and the lens are mounted on a circuit board.

5. The optical system of claim 1, further comprising a light source to transmit light out from the housing to illuminate a portion of the surface, where the set of mirrors is positioned to reflect light from the portion illuminated.

6. The optical system of claim 1, wherein the set of mirrors has an input end where light is received by the set of mirrors from the surface;

wherein the optical system includes a folded optical path defined between the input end of the set of mirrors and the image sensor and a perpendicular optical path defined between the input end of the set of mirrors and the opening; and wherein the parallel optical path is longer than the perpendicular optical path.

7. The optical system of claim 6, wherein the folded optical path includes multiple intersections of overlapping reflections of the light that is reflected back-and-forth between the first mirror and the second mirror.

8. An optical system, comprising:

an image sensor configured to generate image data associated with a surface as the optical system is moved over the surface;

a light folding device configured to optically fold light received from the surface by at least a first mirror and a second mirror, wherein the first mirror and the second mirror are configured to reflect the light multiple times to each other within the light folding device; and a lens within the image folding device configured to optically focus the light onto the image sensor.

9. The optical system of claim 8, wherein the first mirror and the second mirror are two parallel and oppositely mounted mirrors.

10. The optical system of claim 8, where the image data is comprised of back-to-back frames of data, where one frame of data is an image snapshot of a portion of the surface.

11. The optical system of claim 10, where a rate the image sensor captures the back-to-back frames of data is programmable.

12. The optical system of claim 8, where the optical system is implemented in a computer mouse and the image data controls movement of a pointing device on a display.

13. The optical system of claim 8, where the optical system include logic to determine motion of the optical system based at least in part on the image data.

14. A method, comprising:

reflecting light from a surface;

folding the light by reflecting the light multiple times back and forth between at least two mirrors so there are multiple intersections of overlapping reflections:

focusing the folded light from the at least two mirrors onto an image sensor within a handheld device; and generating, by the image sensor, image data of the focused light to determine motion of the handheld device relative to the surface.

15. The method of claim 14, further comprising:

controlling a pointing device based at least in part on the motion of the handheld device.

16. The method of claim 14, further comprising:

reflecting the light from a lens onto the image sensor.

17. The optical system of claim 8, where the image folding device is a tube structure that comprises, at least in part, a reflective interior.

18. The optical system of claim 17, where the tube structure has a rectangular shape.

* * * * *